United States Patent [19]

Soyland

[11] 4,324,305
[45] Apr. 13, 1982

[54] STEERING MECHANISM FOR EXCAVATORS AND THE LIKE

[76] Inventor: Ingebret Søyland, Solhøgda 2, 4340 Bryne, Norway

[21] Appl. No.: 182,044

[22] Filed: Aug. 28, 1980

[30] Foreign Application Priority Data

Sep. 3, 1979 [NO] Norway .................................. 792836

[51] Int. Cl.³ .......................... B62D 5/06; B62D 53/02
[52] U.S. Cl. .................................. 180/134; 180/14 R; 180/144; 180/265; 280/426
[58] Field of Search .................. 180/134, 132, 79, 136, 180/137, 144, 145, 79.3, 79.5, 14 R, 264, 265, 266; 280/400, 426

[56] References Cited

U.S. PATENT DOCUMENTS

| 3,332,509 | 7/1967 | Gondert | 180/144 |
| 3,993,158 | 11/1976 | Weight | 180/134 |
| 4,097,060 | 6/1978 | Unruh | 180/134 |
| 4,102,461 | 7/1980 | Søyland | |

FOREIGN PATENT DOCUMENTS 1924669 12/1969 Fed. Rep. of Germany .
12239 of 1913 United Kingdom ................ 180/265

Primary Examiner—Joseph F. Peters, Jr.
Assistant Examiner—Donn McGiehan
Attorney, Agent, or Firm—Bacon & Thomas

[57] ABSTRACT

A steering mechanism for an excavator or similar vehicle having a pair of steerable wheels and a pair of fixed wheels wherein the steerable wheels are carried by a movable steering fork which is mounted on a circular-shaped rail such that movement of the steering fork around the rail causes steering of the steerable wheels. The axes of rotation of the steerable and fixed wheels remain substantially equidistant from the center of the circle defined by the rail in all positions of the steering fork on the rail. Fluid motors carried by the excavator are operatively connected to the steering fork for moving same around the rail.

10 Claims, 1 Drawing Figure

U.S. Patent
Apr. 13, 1982
4,324,305
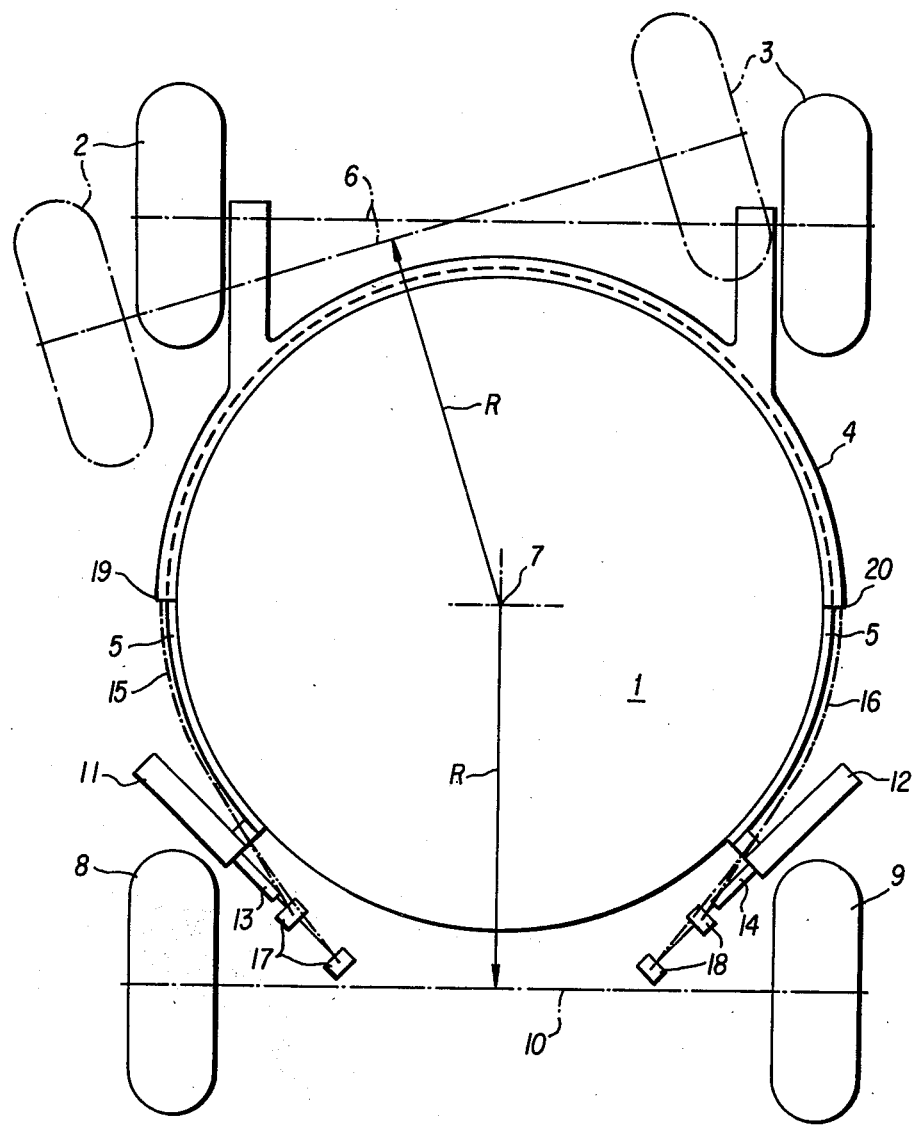

# STEERING MECHANISM FOR EXCAVATORS AND THE LIKE

BACKGROUND OF THE INVENTION

1. Field of the Invention

The present invention generally relates to steering mechanisms for land vehicles. More particularly, the invention is directed to an improved steering mechanism for excavators and similar vehicles which are difficult to steer under certain operating conditions.

2. Description of the Prior Art

Excavators and similar powered vehicles used for excavating the earth are often required to reverse or change directions at relatively high speeds of travel. This becomes a particular problem when such vehicles are provided with rear steerable wheels and front fixed wheels.

SUMMARY OF THE INVENTION

The present invention overcomes the problems associated with heretofore known steering mechanisms for excavators and similar vehicles having pairs of steerable and fixed wheels. This is accomplished by providing a steering fork on which the pair of steerable wheels is mounted. The steering fork is movably mounted on a circular-shaped rail which is in turn rigidly secured around a corresponding circular portion of the excavator body, the latter also carrying a pair of fixed wheels. Steering of the excavator is effected by moving the steering fork around the rail by activating fluid motors, such as hydraulic cylinder units, which are operatively connected to opposite sides of the steering fork through appropriate cable and pulley assemblies. The steerable wheels may serve as either the front or rear wheels of the excavator since steering of the vehicle by this arrangment is facilitated in any direction of travel. This is because the center of the circle defined by the rail always remains substantially equidistant from corresponding points of the respective axes of rotation of both the steerable and fixed wheels.

It is therefore an object of the invention to provide an improved steering mechanism for easily steering excavators and similar vehicles under all operating conditions.

It is another object of the invention to provide a steering mechanism which permits excavators to reverse directions at high speeds of travel.

It is a further object of the invention to provide an improved steering mechanism for excavators and similar vehicles having a pair of steerable wheels disposed at either the front or rear of the vehicle.

These and other objects and advantages of the present invention will become apparent to those skilled in the art by reference to the following description of the preferred embodiments thereof when taken in conjunction with the accompanying drawing wherein like reference characters refer to like elements throughout the view.

BRIEF DESCRIPTION OF THE DRAWING

The single FIGURE is a schematic top plan view of the lower frame of an excavator with the steering mechanism of the invention.

DETAILED DESCRIPTION OF THE PREFERRED EMBODIMENTS

Referring now to the single FIGURE, there is schematically shown an excavator 1 having a body portion which is generally in the shape of a circular vessel or the like. Excavator 1 is provided with a pair of spaced steerable wheels 2 and 3 which are mounted onto a steering fork 4 for rotation about a first axis of rotation 6. Steering fork 4 is generally circular in configuration and is movably supported on a correspondingly-shaped circular rail 5 which is in turn rigidly secured around the circular exterior of excavator 1. Rail 5 may partially or entirely encircle excavator 1 depending upon the degree of steering movement desired for steering fork 4.

The midpoint of first axis of rotation 6 between wheels 2 and 3 is a distance R from a centerpoint 7 of the circle defined by rail 5. Similarly, a pair of spaced fixed wheels 8 and 9 also define a second axis of rotation 10 whose midpoint between wheels 8 and 9 is substantially the same distance R from the centerpoint 7. Through this arrangment, it is therefore clear that corresponding points along axes of rotation 6 and 10 are always substantially equidistant from centerpoint 7 notwithstanding the position of steering fork 4 on rail 5.

The steering of steerable wheels 2 and 3 is accomplished by moving steering fork 4 around rail 5 in either direction through the use of a pair of fluid motors 11 and 12 in the form of hydraulic cylinders having a pair of respective piston rods 13 and 14. Cylinder 11 is operatively connected to an end 19 of steering fork 4 through a cable 15 which is also connected to piston rod 13 through a suitable pulley assembly 17. Similarly, cylinder 12 is operatively connected to an opposite end 20 of steering fork 4 through a cable 16 that is also connected to piston rod 14 through a suitable pulley assembly 18. Thus, through appropriate activation of cylinders 11 and 12 by a pressurized fluid source, steering fork 4 may be moved back and forth around rail 5 in a generally circular path to cause steering of steerable wheels 2 and 3. In an alternative arrangement, cylinders 11 and 12 may be reversed in their position depicted in the FIGURE and the respective ends of piston rods 13 and 14 may be directly connected to the corresponding ends 19 and 20 of steering fork 4. As also seen in the FIGURE, the dotted lines depict the steering of wheels 2 and 3 in the left direction assuming such wheels are utilized as the front wheels of excavator 1.

Since the path defined by steering fork 4 around rail 5 is generally circular in configuration, the respective distances between corresponding points on axes of rotation 6 and 10 from centerpoint 7 of the circle defined by rail 5 shall always remain substantially equal and essentially define a common radius distance from centerpoint 7. Accordingly, this arrangment permits steerable wheels 2 and 3 to function equally well as either the front or rear wheels of excavator 1 since the steering thereof is now easily accomplished under all operating conditions.

While preferred embodiments of the invention have been described herein, many variations thereof shall become apparent to those of ordinary skill in the art, with such variations being within the scope of the invention as hereinafter recited by the appended claims.

I claim:

1. A steering mechanism for an excavator or the like comprising:

(a) a generally circular-shaped rail carried by the excavator;
(b) a steering fork carried by the rail for movement in a generally circular path around the rail;
(c) first wheel means carried by the fork and having a first axis of rotation;
(d) second wheel means carried by the excavator and having a second axis of rotation; and
(e) wherein the center of the circle defined by the rail remains substantially equidistant from corresponding points of the first and second axes of rotation in all positions of the steering fork around the rail.

2. The steering mechanism of claim 1 further including means for moving the steering fork around the rail.

3. The mechanism of claim 2 wherein the steering fork includes a pair of opposite ends and the means for moving the steering fork includes:
(a) a first fluid motor operatively connected to one end of the fork; and
(b) a second fluid motor operatively connected to the opposite end of the fork.

4. The steering mechanism of claim 3 wherein:
(a) each fluid motor includes an hydraulic cylinder and piston rod assembly; and
(b) each operative connection includes a cable and pulley assembly.

5. The steering mechanism of claim 3 wherein:
(a) each fluid motor includes an hydraulic cylinder and piston rod assembly; and
(b) each piston rod is operatively connected to its respective end of the steering fork.

6. The steering mechanism of claim 1 wherein the first wheel means includes a pair of wheels and the steering fork includes:
(a) a generally circular portion conforming substantially to the curvature of the rail; and
(b) a pair of spaced journals for supporting the pair of wheels.

7. The steering mechanism of claim 1 wherein:
(a) the excavator includes a generally circular vessel-shaped portion; and
(b) the rail is secured to the vessel-shaped portion.

8. The steering mechanism of claim 1 wherein the first wheel means and the second wheel means each includes a pair of spaced wheels.

9. The steering mechanism of claim 1 wherein:
(a) the excavator includes front and rear portions;
(b) the first wheel means is disposed at the front portion of the excavator; and
(c) the second wheel means is disposed at the rear portion of the excavator.

10. The steering mechanism of claim 1 wherein:
(a) the excavator includes front and rear portions;
(b) the first wheel means is disposed at the rear portion of the excavator; and
(c) the second wheel means is disposed at the front portion of the excavator.

* * * * *